United States Patent
Metcalfe

(10) Patent No.: US 6,994,888 B2
(45) Date of Patent: *Feb. 7, 2006

(54) COATING COMPOSITION WITH EPOXY-POLYESTER POLYMER

(75) Inventor: Ronald Metcalfe, St. Pierre-les Elbeuf (FR)

(73) Assignee: Imperial Chemical Industries PLC, (GB)

( * ) Notice: Subject to any disclaimer, the term of this patent is extended or adjusted under 35 U.S.C. 154(b) by 190 days.

This patent is subject to a terminal disclaimer.

(21) Appl. No.: 10/205,996

(22) Filed: Jul. 26, 2002

(65) Prior Publication Data

US 2003/0134976 A1     Jul. 17, 2003

Related U.S. Application Data

(63) Continuation of application No. 09/677,180, filed on Oct. 2, 2000, now Pat. No. 6,787,188.

(51) Int. Cl.
C08G 81/00 (2006.01)
C09D 163/00 (2006.01)
C09D 167/00 (2006.01)

(52) U.S. Cl. .................. 427/372.2; 427/375; 427/386; 427/388.2; 525/88; 525/92 A; 525/92 F; 525/96; 525/418; 528/272

(58) Field of Classification Search ............ 525/88, 525/92 A, 92 F, 96, 418; 427/372.2, 375, 427/386, 388.2; 528/272
See application file for complete search history.

(56) References Cited

U.S. PATENT DOCUMENTS 5,567,781 A    10/1996  Martino
6,787,188 B1 *  9/2004  Metcalfe .................. 427/372.2

FOREIGN PATENT DOCUMENTS

| DE | 44 01 438 A |   | 10/1995 |
|----|-------------|---|---------|
| EP | 0 111 986 A2 |   | 6/1984 |
| EP | 0 399 108 A |   | 11/1990 |
| EP | 0 399 108 A1 |   | 11/1990 |
| EP | 0 411 690 A |   | 2/1991 |
| EP | 0561102 A |   | 9/1993 |
| EP | 0 581 599 A |   | 2/1994 |
| JP | 04-57820 | * | 6/1990 |
| JP | 04114073 A |   | 4/1992 |
| JP | 08-12928 | * | 6/1994 |
| JP | 08-333440 | * | 12/1996 |
| WO | WO 00/01779 | * | 1/2000 |

OTHER PUBLICATIONS

Kosaka et al., translation of JP08-12928, Jun. 1984.*
Shilki et al., translation of JP04-57820, Jun. 1990.*
Ooka et al., translation of JP08-333440, Dec. 1996.*

* cited by examiner

*Primary Examiner*—Jeffrey Mullis
(74) *Attorney, Agent, or Firm*—Kenneth J. Stachel

(57) ABSTRACT

A protective coating composition in an organic liquid carrier comprising a polymeric film forming binder, the polymeric binder comprising by weight:
(a) 50% to 100% of an epoxy-polyester block copolymer being the reaction product of a preformed epoxy resin and a preformed carboxyl functional, and (b) 0 to 50% of a crosslinker where the sum of (a) and (b) is 100%,
characterised in that the carboxyl functional polyester prepolymer is the reaction product of one or more polyols with one or more dicarboxylic acids or their anhydrides, where the dicarboxylic acids or anhydrides comprise a mixture of (i) 20% to 45% of an aromatic dicarboxylic acid or its anhydride, (ii) 55% to 80% of cyclohexane dicarboxylic acid, and (iii) 0 to 10% other aliphatic dicarboxylic acid, where the sum of (i), (ii), and (iii) is 100% based on the weight of the dicarboxylic acid and anhydride components.

13 Claims, No Drawings

COATING COMPOSITION WITH EPOXY-POLYESTER POLYMER

This application is a continuation application of U.S. patent application Ser. No. 09/677,180 filed Oct. 2, 2000 and entitled "Coating Composition" now U.S. Pat No. 6,787,188.

This invention relates to a coating composition, its preparation and use. Metal food and drink containers, often referred to as cans, are usually coated on the inside to prevent reaction between the contents and the metal from which the can is formed. Such reaction leads both to unwanted deterioration of the can and also potentially damaging effects on the contents, particularly in terms of changes in quality and taste. Without an interior coating, most cans of food or drink would not remain usable for very long. The coating is often applied to the flat metal by roller coating before the can is formed and then dried or cured in a stoving operation. The can is then formed from the flat metal by a drawing process before being filled with food or drink and finally sealed up.

The coatings are required to have very good flexibility, adhesion, sterilisation resistance and stability properties. Flexibility and adhesion are essential if the coating is to remain intact during the can formation process when the coated flat metal sheet is drawn into the form of the can. When the cans are filled with food, then contents are usually sterilised by heating the sealed can to temperatures of around 130° C. for 1 to 2 hours (depending on the nature of the food). The coating is then in direct contact with the contents of the can for a considerable period of time which could be many years. During sterilisation and subsequent storage, the coating is required to maintain its integrity so as to prevent corrosion of the metal can and to prevent metal migration into the can contents. Additionally, the coating must not impair the contents by releasing unwanted material or by altering the flavour or appearance. These resistance properties impact not only on the shelf life of the product but also on public health and safety. Thus, there are particularly stringent and specific requirements of coating compositions for can interiors which are different from those for other coatings.

One known type of coating composition for cans is based on an epoxy resin. Epoxy resin compositions comprise an epoxy resin and, optionally, a crosslinker such as a phenolic resin dissolved or dispersed in an organic liquid. In those compositions containing a crosslinker, the crosslinker reacts with the epoxy groups on the epoxy resin during the stoving operation so as to form a crosslinked final coating. In known compositions the epoxy resin contains bisphenol A diglycidyl ether (abbreviated to BADGE), a commonly available liquid epoxy resin of low epoxy equivalent weight. Health concerns have arisen over the level of BADGE appearing in food supplied in cans which have been coated on the inside with epoxy coatings which invariably may contain some unreacted BADGE. Low molecular weight BADGE exists at high levels in low molecular weight commercial epoxy resins while low level of BADGE exists in high molecular weight epoxy resins. The concern is that all of the BADGE does not react with the crosslinker and that some of the residual free BADGE can leach out of the coating and into the food. As a result of these concerns, a limit on the level of free BADGE in the final cured coating for the interior of food cans has been proposed based on the amount of free BADGE in the coating and an assumption that all of this could theoretically migrate into the food. The current proposal is a limit on the quantity of free BADGE in the coating such that the contents would contain no more than 1 part per million (ppm) of BADGE if all of the BADGE were to migrate from the coating to the contents. This very low level of free BADGE is not easy to achieve by simple modifications of the existing formulations. The problem is particularly acute in smaller cans which have a larger interior surface area, and thus more coating, in relation to the volume of contents. The problem is to formulate coatings suitable for cans which meet the requirements for very low (less than 1 ppm) or zero (non-detectable) levels of BADGE or similar low molecular weight epoxy-based materials, appearing in food, while retaining or improving on all the other required characteristics of flexibility, adhesion and sterilisation resistance.

European Patent Application EP-A-0 111 986 discloses pigmented coating compositions based on an epoxy-polyester block copolymer in which the polyester component is prepared by polycondensation of terephthalic acid and/or isophthalic acid and a difunctional hydroxy compound having 2–24 carbon atoms. European Patent Application EP-A-0 399 108 discloses similar compositions in which the polyester is the condensation product of a carboxylic diacid and a dihydroxy compound in which the components are non-aromatic. However neither of these types of polymer are suitable for use in can coatings because neither gives the required cured film combination of flexibility, adhesion and sterilisation resistance and compatibility. In accordance with this invention, the cured film problems have been resolved along with extremely low levels of free BADGE by the use of a particular epoxy-polyester block copolymer in combination with fatty acids.

According to the present invention, provided is a coating composition comprising an organic liquid carrier in which is dispersed or dissolved a mixture of organic film forming components comprising by weight:

i) from 50% to 100% of an epoxy-polyester block copolymer consisting of the reaction product of an epoxide terminated epoxy resin and a preformed carboxyl functional polyester polymer, ii) from 0% to 10% of organic monocarboxylic acid, preferably fatty acid, and iii) from 0% to 50% of a crosslinker, where the sum of (i) and (ii) is 100%, characterised in that the preformed polyester polymer is the reaction product of one or more polyols, predominantly diol, with dicarboxylic acid or their anhydrides, where the dicarboxylic acids comprise by weight (a) 20% to 45% of an aromatic polycarboxylic acid or its anhydride, (b) 55% to 80% cyclohexane dicarboxylic acid, and (c) 0% to 10% other difunctional carboxylic acid, where the sum of (a), (b) and (c) equals 100%, and where the epoxy-polyester is optionally further reacted with organic monocarboxylic acid.

It has been found that this use of a combination of an aromatic polyfunctional carboxylic acid or its anhydride and cyclohexane dicarboxylic acid in making the polyester gives rise to unexpectedly improved properties in the final film, particularly better adhesion, sterilisation and flexibility when compared to the use of either aromatic or aliphatic acids alone to produce BADGE-free or low-BADGE (containing less than 1 ppm) can coating compositions.

The resulting epoxy-polyester copolymer is the reaction product of an epoxy resin with a carboxyl functional polyester consisting of residue of the carboxyl functional polyester esterified with the residue of the epoxy resin, where the copolymer contains between 1 and 20 and preferably between 1 and 10 ester polymeric units. In preferred aspects of the invention, organic aliphatic monocarboxylic acid, preferably fatty acid, is further reacted with the epoxy-polyester polymer. The organic liquid carrier can be one or more organic liquids in which the epoxy-polyester block copolymer can be dissolved or dispersed. Typical organic liquids are aromatic solvents commercially available as Solvesso 100□ or Solvesso 150™ from Exxon.

Referring now to the epoxy prepolymer, suitable epoxy resins are aromatic or aliphatic epoxy resins with aromatic epoxy resins being preferred. Useful epoxy resins are predominantly linear chain molecules comprising the coreaction product of polynuclear dihydroxy phenols or bisphenols with halohyrdrins to produce epoxy resins containing preferably two epoxy groups per molecule. The most common bisphenols are bisphenol A, Bisphenol F, bisphenol S and 4,4'-dihydroxybisphenol, with the most preferred being Bisphenol A. Halohydrins include epichlorohydrin, dichlorohydrin and 1,2-dichloro 3-hydroxypropane, with the most preferred being epichlorohydrin. Preferred epoxy resins comprise the coreaction product of an excess of halohydrin with bisphenol to produce predominantly an epoxy group (epoxide) terminated linear molecular chain of repeating units of diglycidyl ether of bisphenol-A containing between 2 and 25 repeating copolymerised units of diglycidyl ether of bisphenol-A. In practice, excess molar equivalents of epichlorohydrin are reacted with bisphenol-A to produce epoxy resins where up to two moles of epichlorohydrin coreact with one mole of bisphenol-A, although less than complete reaction can produce difunctional epoxy resin along with monoepoxide chains terminated at the other end with a bisphenol-A unit. The preferred linear epoxy resins are polyglydicyl ethers of bisphenol-A having terminating 1,2-epoxide groups and an epoxy equivalent weight between 150 and 5,000, preferably between 150 and 2,000, and a number average molecular weight from about 200 to 10,000, preferable from 200 to 5,000, as measured by gel permeation chromatography (GPC). Commercial diglycidyl ether of bisphenol-A (liquid epoxy) can be reacted with additional bisphenol-A to advance the epoxy and increase the molecular weight. The desired molecular weight and final oxirane content is controlled by adjusting the ratio of the two components and the extent of the reaction. Commercially available epoxy resins include Dow Chemical epoxy resins identified by trade number and equivalent weights as follows: DER 661 (525); DER 664(900); DER 667 (3600); and DER 668 (5500); while Shell Chemical epoxy resins are EPON 1001 (525); EPON 1007 (2000); EPON 1009F (3000); EPON 1007F (4000); and EPON 1009 (6500); and Ciba-Giegy linear epoxy reins GT-7013 (1400); GT-7014 (1500); GT-7074 (2000); and GT-259 (1200). Although not as common, trifunctional epoxy resins are useful comprising branched chain epoxy resins where the branched chains as well as the backbone chain are each terminated with a terminal epoxide groups to provide greater than two epoxide functionality. Trifunctional epoxy resins can be produced by coreacting epichlorohydrin with polynuclear polyhydroxy phenols, trifunctional phenols, or aliphatic trifunctional alcohols.

Useful epoxy resins further include non-aqueous alkylene oxide resins which are epoxide functional resins comprising an alkylene oxide adduct of a bisphenol compound. The alkylene oxide is an aliphatic alkyl derivative having up to about 26 carbon atoms although preferred oxides are lower alkyl oxides such as ethylene, propylene, and butylene oxides. Bisphenol compounds include bisphenol-A, bisphenol-F and bissulfone or sulfides. Typically two or more moles of alkyl oxide are coreacted with one mole of bisphenol compound. Preferred compositions are 2:1 molar reactions while suitable number average molecular weight range of alkylene oxide resins is between 200 and 1,000 as measured by GPC. The most preferred preformed epoxy resin contains two epoxy groups per molecule and the preferred epoxy is based on bisphenol-A.

Referring next to the preformed carboxyl functional polyester, the polyester comprises polyol, predominantly or entirely a glycol or a diol, esterified with excess equivalents of dicarboxylic acid or anhydrides including considerable amounts of cyclohexane dicarboxylic acid. On a weight basis, the polyester comprises between 55% and 80% cyclohexane dicarboxylic acid, between 20% and 45% aromatic dicarboxylic acid or anhydride, and between 0 and 10% other aliphatic dicarboxylic acid. Useful polyfunctional alcohols have two or more hydroxy groups where the predominant polyol contains two hydroxyl groups. Examples of suitable polyols include ethylene glycol, 1,4-butane diol, 1,2-propylene glycol, 1.3-propylene glycol, methyl propane diol, neopentyl glycol, 1,6-hexane diol, butyl ethyl propane diol, hydroxy pivolyl hydroxy pivalate, cyclohexane dimethanol, trimethylol propane, pentaerythritol and glycerol. 1,4-butane diol is preferred. Minor amounts of glycerol, pentaerythritol, dipentaerythritol or trimethylolethane or propane can be used if desired. Examples of suitable aromatic dicarboxylic acids are phthalic acid, terephthalic acid or isophthalic acid with isophthalic acid particularly preferred. The anhydride derivatives of these acids an also be used if they exist as anhydrides. The dicarboxylic acid content of the polyester prepolymer further comprises between 55% and 80% cyclohexane dicarboxylic acid. Preferably less than 10% by weight of the dicarboxylic acid content comprises other aliphatic dicarboxylic acids. examples of other aliphatic polyfunctional carboxylic acids are malonic acid, succinic acid, glutaric acid, adipic acid, azelaic acid, suberic acid, sebacic acid, dimer fatty acids, maleic acid and dimer fatty acids. Hydroxy acids can also be included in the polyester such as 12 hydroxy stearic acid, lactic acid and 2-hydroxy butanoic acid. To provide a carboxyl terminated polyester, the equivalent excess or dicarboxylic acid over polyol is between 0.02 and 0.784, and preferably between 0.04 and 0.554. The acid number of the preformed polyester should be greater than 5 and preferably between 10 and 140 mgKOH/g.

The preformed polyester can be made by heating the components together at a temperature of 150 to 280° C., preferably 200 to 250° C. and removing the water evolved for example by azeotropic distillation with the aid of an organic solvent such as toluene or xylene. Heating is continued until the polyester has an acid number preferably between 10 and 140 mgKOH/g, more preferably 20 and 110. A catalyst can be used to speed up the esterification reaction. suitable catalysts are acid catalysts such as sulphuric acid, paratoluene sulphonic acid or tin catalysts, such as dibutyl tin dilaurate. The hydroxyl number of the polyester is preferably no higher than 2, and more preferably 0 to 0.8. The number average molecular weight of the preformed polyester is preferably 800 to 15 000, and more preferably 800 to 8000.

In accordance with this invention, the epoxy-polyester block copolymer can be prepared by heating the acid functional polyester polymer and the epoxy resin together at a temperature of 110 to 180° C., preferably 120 to 170° C. for 1 to 5 hours, preferably 2 to 4 hours. A catalyst for the carboxyl/epoxy reaction can be included such as triphenyl phosphine, benzyl triphenyl phosphonium chloride, benzyl trimethyl ammonium methoxide, a tertiary amine such as benzyl dimethylamine or a metal compound such as zirconium octoate. The reaction can be carried out in a suitable solvent such as toluene or xylene. The weight ratio of the polyester and the epoxy resin is preferably chosen so that the equivalent ratio of epoxy groups from the epoxy resin to acid groups from the polyester is 1:2 to 2:1, more preferably 1.6:1 to 1:1.6. The resulting epoxy-polyester block copolymer preferably has a number average molecular weight of 3 000 to 40 000, and a low Acid Number below 10 and preferably less than 1 mgKOH/g.

In a preferred aspect of this invention, the epoxy-polyester block copolymer is further reacted with an organic monocarboxylic acid, preferably an aliphatic monocarboxylic acid, and most preferably an aliphatic fatty acid having a fatty acid chain of 8 to 24 carbon atoms. The most preferred fatty acids ordinarily are derived from vegetable oils or fats which conventionally contain a mixture of glyceride oils comprising glycerol esters of fatty acid. Fatty acids are typically obtained by hydrolysis of vegetable oils or fats. Useful fatty acids include lauric acid, capric acid, palmitic acid, stearic acid, oleic acid, linoleic acid, linolenicacid, eleostrearic acid and ricinoliec acid. The preferred fatty acid is coconut fatty acid. Less preferred lower aliphatic monocarboxylic acids can include formic acid, acetic acid, propionic acid, n-butyric acid, isobutyric acid, n-valeric and isovaleric acids, pivalic acid, and capronic acid. less preferred aromatic monocarboxylic acid include benzoic and toluic acids. In accordance with this invention, the organic monocarboxylic acid is post reacted with unreacted epoxide associated with the prior formed epoxy-polyester block copolymer.

Surprisingly it has been found that the levels of free epoxy resin (particularly low molecular weight resin such as BADGE) in the final composition can be further reduced by heating the block copolymer in the presence of an acid or a base, of which phosphoric acid has been found particularly effective. The copolymer can be heated in the presence of the phosphoric acid or base for example for 30 to 240 minutes at 100 to 200° C., preferably 1–3 hours at 120 to 180° C. Preferred bases are dimethyl benzylamine, diethylene triamine, and tributyl amine. The acid or base can be added at levels of, for example, 0.2 to 10% by weight based on the polymer solids, preferably 0.5 to 10%. Such treatment can reduce the level of free epoxy resin below normally detectable limits.

Preferably the composition comprises at least 1% by weight of crosslinker and more preferably comprises from 50 to 97 parts by weight of epoxy-polyester block copolymer and 3 to 50 parts by weight of crosslinker. The crosslinker is a material which will react with the epoxy polyester to give rise to a crosslinked final coating. Examples of suitable crosslinkers are phenolic resins, amino resins and blocked polyisocyanates. Preferably the crosslinker is a phenolic resin. Phenolic resins are reaction products of phenol compounds with formaldehyde, and are divided into resols in which the reaction is base catalysed and novolacs in which the reaction is acid catalysed. When a cross linker is used, the coating compositions can also contain a catalyst for the reaction between the remaining epoxy groups on the epoxy polyester polymer and the phenolic resin such as phosphoric acid. The compositions can be made by mixing the components in any order, such as by adding the epoxy-polyester block copolymer and the crosslinker to the organic liquid carrier.

The compositions also preferably contain finely divided PVC, in which case the liquid medium is chosen so as to dissolve the PVC polymer to only a minor extent or not at all. Such compositions are referred to as PVC organosols. PVC organosols are particularly known for their flexibility and sterilisation resistance properties and are used for cans containing some of the more aggressive products, such as acid-containing foods. They are also used for "easy open ends", that is to coat the inside of food or drink cans is which the metal (usually the lid, or part of the lid) is partially cut through during manufacture to facilitate opening of the can by the consumer using a ring-pull or similar opener. Where PVC is used, the epoxy resin is found to stabilise the PVC polymer against decomposition during curing of the composition after it is applied to the metal. Useful PVC is preferably finely divided polyvinyl chloride in powder form is commercially available from a number of sources. Preferably the PVC powder has a particle size range of 0.5 to 12 μm. Examples of suitable commercially available PVC powders are Geon 171™ (from the Geon Company) and Vinnol P70™ from Wacker Chemie). Preferred compositions comprise 10 to 80 weight % of PVC based on the total non-volatile weight of epoxy-polyester block copolymer, crosslinker and PVC, more preferably 20 to 70 weight %. The PVC is preferably added to the compositions by what is known as a grinding process using a ball mill or sand mill.

Preferably the compositions are pigment free when they are for use in coating the interior of cans. Pigments tend to be a source of weakness in such coatings and are often detrimental to their performance. Other components of the compositions can be waxes and flow additives as well as other conventional coating components. The compositions preferably contain less than 1 ppm of BADGE, more preferably less than 0.5 ppm and most preferably below detectable limits.

The compositions can be applied as coatings to a variety of substrates such as plastic, glass or metal but are particularly suited to coating metal. In particular they are useful in coating food or beverage cans, especially the interiors of such cans where their low or undetectable BADGE content and their other properties make them particularly desirable. The composition can be applied as a film by conventional means such as brushing, roller coating or spraying. Roller coating is the preferred method when coating flat metal for can manufacture and spraying is preferred when coating preformed cans.

The applied film of the composition can be dried and cured by heating to drive off the organic liquid and to accelerate the crosslinking reaction between the epoxy-polyester and the crosslinker. The composition is typically heated to 150–220° C. for 1 to 20 minutes in order to form a dried, cured film. A so-called "flash-stoving, i.e 10–30 seconds at a peak metal temperature of 220–260° C. can also be used.

Another type of stoving is induction curing i.e. 4–6 seconds at a peak metal temperature 280–320° C. PMT. Compositions were evaluated on tinplate for use on easy-open ends. Easy open ends require cured coatings exhibiting high flexibility and sterilisation resistance, as well as the normal tests, wedge bend drawn cans and ends. Good resistance to feathering which is the uneven tearing of the film at the easy open end edge on opening is also required. A test for feathering is as follows:

A 5 cm×10 cm panel coated with the composition is placed on a flexible support—rubber pad, wads of paper. The internal coating to be evaluated is in contact with the support. On the back of the panel, a metal ruler is placed and the metal is scored with a scalpel longitudinally, perpendicular to the metal grain at a distance of about 1–1½ cm from the edge. There is now a longitudinal bump on the internal coating. The metal is then cut with scissors about 1 cm along the groove/bump and the approximately 1½ cm width is gripped in a sardine can opener and the strip is rolled slowly around the opener—exactly as when opening a can. The metal panel is then turned over and the edge of the flat part examined with the naked eye and with a magnifying glass. Ideally the interior coating should not go beyond the metal. A slight amount of varnish detached from the rolled part is tolerated—width 0.5 mm. This varnish should be a uniform strip, and not present a feathered appearance—which is indicative of detached varnish particles which could fall into the food/beverage. This method is a severe control, since if done quickly i.e. at the speed of opening a can, then the cut edge should be perfect. This test is carried out on non-sterilised and sterilised panels.

The invention will now be illustrated by means of the following examples;

EXAMPLES

A series of 14 compositions were made, applied to metal panels, stoved and then subjected to adhesion, and sterilisation resistance tests. The compositions generally comprised an epoxy-polyester block copolymer and a PVC powder carried in an organic liquid. The compositions were made by first making a polyester polymer, reacting this with an epoxy resin so as to form an epoxy-polyester block copolymer and then dispersing a PVC powder into a solution of the block copolymer.

1. Preparation of Polyester Polymer

The following general method was used to produce a series of 15 polyester polymers using the components listed in Table 1.

The components from Table 1 were heated to 235° C. with stirring under nitrogen in apparatus equipped with a fractionating column and condenser for removing water. The components were heated with removal of water until the reaction product in the flask had an acid value of 49–51 mgKOH/g of non-volatile material. About 3 parts of xylene were added near the end of the process when removal of water becomes slow. The abbreviations for Table 1 are given after the table. In Table 1 the main figures relate to parts by weight and those in brackets refer to molar parts.

In order to anticipate glycol losses during processing, the quantities of 1,4 butanediol or other glycol are increased by 3% over that required to give the desired functionality. In the event the Acid Value remains above the desired 49–51 mgKOH/g, then a minimal amount of suitable glycol is added to sufficiently lower the Acid Value and compensate for glycol losses greater than the anticipated 3%

TABLE 1

| Component | EXAMPLE NUMBER | | | | | | | |
|---|---|---|---|---|---|---|---|---|
| | 1 | 2 | 3 | 4 | 5 | 6 | 7 | 8 |
| Polyfunctional Alcohols | | | | | | | | |
| 1,4-butane diol | 266.35 | 259.23 | 262.83 | 261.92 | 264.66 | 284.77 | 239.59 | 248.81 |
| | (2.959) | (2.880) | (2.920) | (2.910) | (2.941) | (3.146) | (2.662) | (2.765) |
| neopentyl glycol | 102.87 | 100.12 | 101.52 | 101.17 | 102.23 | 109.03 | 93.37 | 96.97 |
| | (1.099) | (0.963) | (0.976) | (0.973) | (0.983) | (1.048) | (0.898) | (0.932) |
| Polyfunctional acids | | | | | | | | |
| Isophthalic acid | 726.97 | | 358.55 | 267.99 | 541.58 | 288.80 | 247.34 | 256.86 |
| | (4.379) | | (2.160) | (1.614) | (3.263) | (1.740) | (1.490) | (1.547) |
| 1.4-cyclohexane dicarboxylic acid | | 733.10 | 371.51 | 462.80 | 187.05 | | | |
| | | (4.262) | (2.160) | (2.691) | (1.088) | | | |
| adipic acid | | | | | | 423.34 | | |
| | | | | | | (2.90) | | |
| sebacic acid | | | | | | | 501.63 | |
| | | | | | | | (2.483) | |
| azeleic acid | | | | | | | | 484.83 |
| | | | | | | | | (2.579) |
| Fascat 4102 | 1.30 | 1.30 | 1.30 | 1.30 | 1.30 | 1.30 | 1.30 | 1.30 |
| CHARACTERISTICS | | | | | | | | |
| Polyester Acid Functionality | 1.97 | 1.97 | 1.99 | 1.99 | 1.99 | 1.99 | 1.94 | 1.98 |
| Theoretical MW by number | 2314 | 2246.0 | 2274.0 | 2263.0 | 2290.0 | 2289.0 | 2216.0 | 2302.0 |
| Weight of solid DER 671 (EEW 485) | | | | | 583.20 | | | |
| Acid value of epoxy polyester mg/g | 1.10 | 0.14 | 0.22 | 0.30 | 0.32 | 0.00 | 0.21 | 0.10 |
| EEW of epoxy polyester | 5090.0 | 4990.0 | 4670.0 | 4680.0 | 4360.0 | 4480.0 | 4370.0 | 4430.0 |
| Theoretical MW by number | 8841.0 | 8319.0 | 8547.0 | 8612.0 | 8940.0 | 8971.0 | 8273.0 | 9043.0 |
| Solid content 200° C. 10 mins | 47.5% | 48.4% | 50.2% | 47.2% | 51% | 49.8% | 49.7% | 49.8% |
| Viscosity poises | 61.00 | 17.00 | 29.00 | 61.00 | 46.00 | 23.00 | 43.00 | 31.00 |

TABLE 1-continued

| | EXAMPLE NUMBER | | | | | | |
|---|---|---|---|---|---|---|---|
| | 9 | 10 | 11 | 12 | 13 | 14 | 15 |
| Polyfunctional Alcohols | | | | | | | |
| butane diol | 354.64 (3.940) | | | | | | 239.13 (2.657) |
| neopentyl glycol | | 101.17 (0.973) | 93.37 (0.898) | 87.36 (0.84) | 84.05 (0.808) | 76.39 (0.735) | 93.28 (0.897) |
| methyl propane diol | | 261.92 (2.910) | | | | | |
| 1,6-hexane diol | | | 314.12 (2.662) | | | | |
| 1,6-cyclohexane dimethanol | | | | 354.37 (2.461) | | | |
| butyl ethyl propane diol | | | | | 376.52 (2.353) | | |
| hydroxypivalyl hydroxypivalate | | | | | | 427.74 (1.998) | |
| Polyfunctional acids | | | | | | | |
| isophthalic acid | 271.94 (1.638) | 267.99 (1.614) | 247.33 (1.490) | 231.40 (1.394) | 222.63 (1.341) | 202.36 (1.219) | 168.16 (1.013) |
| 1,4-cyclohexane dicarboxylic acid | 469.62 (2.730) | 462.80 (2.691) | 427.11 (2.483) | 399.61 (2.323) | 384.47 (2.235) | 349.46 (2.032) | 581.15 (3.379) |
| Fascat | 1.30 | 1.30 | 1.30 | 1.30 | 1.30 | 1.30 | 1.30 |
| CHARACTERISTICS | | | | | | | |
| Acid Functionality of polyester | 1.99 | 1.98 | 1.94 | 1.96 | 1.95 | 1.97 | 1.972 |
| Theoretical MW by number | 2297.00 | 2262.00 | 2216.00 | 2232.00 | 2225.00 | 2248.00 | 1143.00 |
| Weight of solid dER 671 (EEW 485) | | | | 583.20 | | | |
| Acid value of epoxy polyester mg/g | 0.10 | 0.18 | 0.37 | 0.13 | 0.12 | 0.07 | |
| Polyester Epoxy equivalent weight | 4400.00 | 4360.00 | 4340.00 | 3525.00 | 4023.00 | 4416.00 | |
| Theoretical MW by number | 8919.00 | 8689.00 | 8273.00 | 8408.00 | 8376.00 | 8547.00 | |
| Solid content 200° C. 10 mins | 50.1% | 50.4% | 50% | 48.2% | 50.4% | 50.7% | |
| Viscosity poises | 43.00 | 22.00 | 55.00 | 43.00 | 13.00 | 13.00 | |

Fascat = Fascat 4102 ™, a tin based esterification catalyst from Ceca Atochem.

2. Preparation of Epoxy Terminated Epoxy-polyester Block Copolymer

2.1. Epoxy-polyester Block Copolymers 1 to 14

Solvesso 150 (a high boiling aromatic solvent from Exxon, 181 parts) was added to the polyester polymers 1 to 14 prepared in 1 above (954 parts) followed by an epoxy resin (DER 671X75™ from DOW, 778 parts at 75% solids in xylene) The resulting mixture was diluted to a theoretical solids content of 70% by addition of methoxypropyl acetate (92 parts) and Solvesso 150 (182 parts). Triphenyl phosphine (2.22 parts) was added and the mixture was heated to 145–150° C. until the measured acid value was 0.5 mgKOH/g or less and the epoxy equivalent weight is 3500 to 4500. The resulting epoxy-polyester block copolymer was diluted to a solids content of 47.5–50% depending on viscosity, with a 29/17/54 blend of Solvesso 150, Solvesso 100 (a high boiling aromatic solvent from Exxon) and methoxy propanol.

2.2 Carboxy Terminated Epoxy-polyester Block Copolymers 16 to 17

Solvesso 150 (a high boiling aromatic solvent from Exxon, 181 parts) was added to the polyester polymer 15 prepared in 1 above (954 parts) followed by an epoxy resin (DER 671 x 75 from DOW, at 75% solids in xylene) in amounts set out below. In Examples 16 to 18 below, the ratio of polyester to epoxy varied as indicated.

| Polyester | Amount of epoxy resin |
|---|---|
| Ex 15 (954 g. solids) | 497.62 g (0.517 mols) For Example 16 |
| Ex 15 (954 g. solids) | 665.58 g (0.685 mols) For Example 17 |
| Ex 15 (954 g. solids) | 746.98 g (0.769 mols) For Example 18 |

3. Preparation of Coating Compositions 1 to 14

Coating compositions 1 to 14 were made from the components listed in Table 2 below. Components 1 to 5 were ground together and components 6 to 12 were subsequently added in the order given. The resulting coating compositions had a solids content of around 46–48% and had a viscosity suitable for roller coating. The coatings have the same number as the epoxy-polyesters in Table 1.

| Number | Component | Parts by wt. |
|---|---|---|
| 1.00 | Solvesso 100 | 135.46 |
| 2.00 | methoxy dipropanol | 135.46 |
| 3.00 | Epoxy-polyester block copolymer from Table 1 | 295.42 |
| 4.00 | Wax | 8.76 |
| 5.00 | PVC | 289.38 |
| 6.00 | Phosphoric acid (75% aqueous solution) | 1.27 |
| 7.00 | methoxy dipropanol | 5.06 |
| 8.00 | HEH 0960 Phenolic resin (Holden) | 65.22 |
| 9.00 | RS 136 Phenolic resin (Holden) | 11.28 |
| 10.00 | FVH 1634 Catalyst (Holden) | 9.49 |
| 11.00 | Solvesso 100 | 21.61 |
| 12.00 | methoxy dipropanol | 21.61 |

Unfortunately it proved impossible to incorporate polymer 1 into a coating composition with PVC as the mixture solidified during preparation.

Preparation of Comparative Coating Composition 19

Epoxy-polyester block copolymer 4 at 48.0% solids by weight was heated at 136° C. to 138° C. (Reflux) with 0.2% phosphoric acid for one hour, then cooled and diluted in 1:1 solvessol 100 and methoxy dipropanol to 45% solids. This modified copolymer was used to make coating composition 19 in exactly the same method as that used above for compositions 1 to 14 with the weight for weight replacement of the phenolic resins HE 0960 and RS 136 with Phenodur 285™ (from Hoechst) and the use of a higher level 3.38 parts of wt. of phosphoric acid (75% Aq. solution). The resulting coating was substantially free of BADGE and gave reasonable sterilisation results on tin plate. Results on T.F.S. (tin free steel) were not as good.

4. Testing

Compositions 2 to 14 were applied onto panels of tin free steel and tin plate at a film weight of 12 g/m² and stoved for 15 minutes at a peak metal temperature of 190° C. Specimens with dimensions of about 12.5×5 cm were cut out from these panels and the cured films were subjected to the following tests;

Wedge Bend;

The test panel was bent longitudinally through 180° over a 6 mm mandrel and then removed from the mandrel and a standard weight wedge shaped was dropped from a standard height onto the panel to create a sharp conical bend. The bend is then placed in acidified copper sulphate which reveals any metal uncovered by copper deposition. The panel is dried and then Scotch™ tape (grade 3M™ 610) was firmly stuck all along the bend and ripped off to reveal any loss of adhesion. The results are rated according to the percentage coating remaining along the length of the bend.

Sterilisation Resistance;

Bent panels were prepared as for the wedge-bend test and then sterilised at 130° C. for 1.5 hours in a solution of 1% sodium chloride and 2% tartaric acid. The coating on the bends are then visually examined. A whitening of the film indicate poor sterilisation resistance as does blistering. These sterilised wedge bends are then scotch taped as above to determine adhesion after sterilisation.

5. Test Results

| | Wedge Bend | | |
|---|---|---|---|
| Composition | Flexibility | Adhesion | Sterilisation Resistance |
| 1 | — | — | — |
| 2 | 100% | No Loss | Poor |
| 3 | 100% | Great Loss | Good |
| 4 | 100% | No Loss | Good |
| 5 | 88% | Slight Loss | Poor |
| 6 | 88% | Great Loss | Very Poor |
| 7 | 82% | Great Loss | Very Poor |
| 8 | 82% | Great Loss | Very Poor |
| 9 | 100% | Slight Loss | Very Poor |
| 10 | 100% | No Loss | Good |
| 11 | 100% | No Loss | Good |
| 12 | 100% | No loss | Good |
| 13 | 82% | No Loss | Very Good |
| 14.00 | 82% | No Loss | Very Good |

TABLE 4

| INGREDIENT | EXAMPLE | | |
|---|---|---|---|
| WEIGHT (Moles) | 16* | 17 | 18 |
| 1,4 Butanediol | 239.13 (2.657) | " | " |
| Neopentyl Glycol | 93.28 (0.897) | " | " |
| Isophthalic Acid | 168.16 (1.013) | " | " |
| 1,4 Cyclohexane Dicarboxylic Acid | 581.15 (3.379) | " | " |
| Acid Value of Polyester mg/g | | 100 mg/g | |
| Acid Functionaty | | 1.97 | |
| Molecular weight by number | | 1143 | |
| Weight (moles[1]) Solid E1001. MW+ = 972. EEW = 486 | 497.62 (0.517) | 665.58 (0.685) | 746.98 (0.769) |
| CHARACTERISTICS OF THE EPOXY-POLYESTER | | | |
| Solids | 50.4% | 47.7% | 47.7% |
| Viscosity | 15 poises | 54 poises | 118 poises |
| Acid value | 25.4 mg/g | 11.2 mg/g | 6.8 mg/g |
| Epoxy Equivalent Weight | 54340 | 25230 | 20000 |

*A version of this example was made in EEP and had an undetectable BADGE level. The normal ie. Solvesso 100 containing version was evaluated as an organosol as in Examples 1–14 and found to have poor sterilisation resistance but excellent flexibility and adhesion. The other examples have not yet been evaluated. In view of their very high EEW, they could avoid H3PO4 treatment. Even if not sterilisable, they could be used in pasteurisable formulae.

Example 16—to the above are added 178.5 parts sol.150, then the epoxy, then 92 parts methoxy propyl acetate, then 178.5 sol. 150 Triphenyl phosphine 2.03 parts. Heated to a constant acid value of around 26 mg/g.

Example 17—to the above are added 186 parts sol. 150, then the epoxy then 92 parts methoxy propyl acetate, then 186 parts solvesso 150. Triphenyl phosphine 2.27 parts. Heated to a constant acid value of around 12 mgKOH/g.

Example 18—to the above are added 190 parts solvesso 150, then the epoxy, then 92 parts methoxy propyl acetate then 190 parts solvesso 150. Triphenyl phosphine 2.38 parts. Heated to a constant acid value of around 7 mgKOH/g.

7. Example 20. Preparation of a Fatty Acid Modified Epoxy-Polyester LX 190/101/2

7.1. The ingredients and weights of Example 4 reproduced as follows were processed according to the method described in Section 2.1 above.

| | | |
|---|---|---|
| butane diol | 261.92 | (2.910) |
| neopentyl glycol | 101.17 | (0.973) |
| isophthalic acid | 267.99 | (1.614) |

Ingredients 1–5 were pre-mixed with a COWLES Blade, then ground for about 20 minutes in a sand grinder. The temperature was allowed to go to 37–38° C. Ingredients 6–8 were added and the resultant product applied at 20 g/m² onto tinplate and stoved 4–6 seconds with a laboratory induction equipment.

Test results for head cured coating film of composition Example 21 are shown in Table 5 below

TABLE 5

| | BEFORE | | STERILISATION 130° C. 1½ HOURS (Feathering-Varnish width after sterilisation) | | | | |
|---|---|---|---|---|---|---|---|
| WEDGE BEND | STERILISATION (VARNISH WIDTH) | ASYMMETRIC CAN | 3% Acetic Acid | 2% Tartaric Acid | 1% Salt | 1% Citric + 1% Salt | Panel ½ water/ steam |
| 100% | 0.5 mm | All 4 angles and shoulder good | OK (0.2 mm) | OK (0.2–0.3 mm) | Slight Whitening of film | OK (0.2 mm) | Slight whitening or de-colouration |

-continued

| | | |
|---|---|---|
| 1,4-cyclohexane dicarboxylic acid | 462.80 | (2.691) |
| FASCAT | | 1.3 |

Then add 583.2 g solid DER 671 and other components indicated in Section 2.1 above, except at Acid Value less than 0.5 mg./g and while still at 145 to 150° C. and 70% NVM solids by weight, the following ingredients were added:

| | |
|---|---|
| Coconut fatty acids (Prifac 7907 TM, Unichemcia Int.) which is 4% by wt. based wt. of epoxy-ester | 61.5 g |
| Methoxy propyl acetate Resiflow FL2 (Worlec) antifoam agent Dimethyl ethanolamine (0.2% on resin solids) | 25.39 g |

The resulting resin, still at 70% NVM resin solids, is then heated to reflux (155° C. to 165° C.) and maintained for 1.5 to 2.5 hours until the resin Acid Number is below 1 and the epoxy equivalent weight is 9000 to 11000. The resin was further diluted in accordance with 2.1. The resulting modification provided a resin essentially free of BADGE.

8. Example 21; Using Fatty Acid Modified Epoxy-polyester of Example 20

| | | Solids |
|---|---|---|
| 1) Epoxy-polyester Ex.20 | 302.88 | 143.57 |
| 2) PVC | 292.99 | 292.22 |
| 3) WAX VM47 | 7.24 | / |
| 4) Solvesso 100 | 129.65 | / |
| 5) Methoxy propanol | 129.64 | / |
| 6) FVH 1634 | 17.94 | / |
| 7) Phosphoric acid 20% solution in Butanol | 7.88 | / |
| 8) Rutaphen LB7700 (Bakelite) | 111.78 | 78.25 |
| | 1000.00 | 514.81 |

Percentage solid composition: PVC 56.9%; modified epoxy-polyester 27.9%; phenolic resin 15.2%. Viscosity=94 seconds AFNOR 4 Cup at 25° C.

9. Example 22

Conventionally stoved organosol using fatty acid modified epoxy-polyester.

| MIXTURE 119 | | SOLIDS | % |
|---|---|---|---|
| 1) Epoxy-polyester Ex.20 (47.6% solids) | 278.29 | 132.47 | 29.93 |
| 2) VM 47 wax | 8.12 | 259.61 | |
| 3) PVC | 259.61 | | 58.66 |
| 4) Solvesso 100 | 121.06 | | |
| 5) Methoxy Dipropanol | 121.06 | | |
| 6) Phosphoric acid 20% in Butanol | 8.51 | | |
| 7) HEH 0960 (49% solids) or Phenodur 285 | 59.58 | 29.19 | 6.60 |
| 8) RS 136 (50% solids or alternative phenolic | 10.25 | 5.13 | 1.16 |
| 9) FVH 1634 (30% solids) | 12.93 | / | |
| 10) Cymel 1123 (98%) DYNO CYANAMD | 4.40 | 4.31 | 0.97 |
| 11) Dynapol LH 826 (55% solids) (HULS) | 21.60 | 11.88 | |
| 12) Solvesso 100 | 47.29 | | 2.68 |
| 13) Methoxy Dipropanol | 47.29 | | |
| | 1000 | 442.59 | 100 |

As before, components 1 to 5 were pre-mixed with a cowles blade, then ground in a sand mill for about 20 minutes, preventing the temperature from rising above 37–38° C. The other ingredients were added with simple stirring. The organosol was applied at 18 mg/m² into tinplate and T.F.S. and stoved for 15 minutes with 9 minutes at a peak metal temperature of 190° C.

The test results on cured coating films from composition Example 22 are shown in Table 6 below.

TABLE 6

| WEDGE BEND | Flexibility Adhesion | 94% OK |
|---|---|---|
| Sterilisation Resistance (130° C. for 1 hr.30 min) | Good on Tinplate nd TFS in:- | (a) 1% salt solution (b) 1% citric acid (c) 1% salt |

The invention claimed is:

1. A metal can protective coating composition in an organic liquid carrier comprising a polymeric film forming binder, the polymeric binder comprising by weight:

(a) 50 to 100% of an epoxy-polyester block copolymer being the reaction product of a preformed epoxy resin and a preformed carboxyl functional polyester prepolymer, having a residue of carboxy functional polyester esterified with the residue of the epoxy resin and (b) 0 to 50% of a crosslinker where the sum of (a) and (b) is 100%, characterized in that the carboxyl functional polyester prepolymer is the reaction product of one or more polyols with one or more dicarboxylic acids or their anhydrides, where the dicarboxylic acids or anhydrides comprise a mixture of (i) 20% to 45% of an aromatic dicarboxylic acid or its anhydrides, (ii) 55 to 80% of cyclohexane dicarboxylic acid, and (iii) 0 to 10% other aliphatic dicarboxylic acid, where the sum of (i), (ii), and (iii) is 100% based on the weight of the dicarboxylic acid and anhydride components, whereby protective coatings from the protective coating composition have an amount of bisphenol A diglycidyl ether (BADGE) of less than 1 ppm.

2. A coating composition according to claim 1 which comprises 50% to 97% by weight of epoxy-polyester block copolymer and 3% to 50% by weight of the crosslinker.

3. A process of coating substrates selected from plastic, glass, metal or metal cans which comprises applying a layer of a composition as claimed in claim 1 and drying and curing it by heating.

4. A substrate selected from the group of plastic, glass or metal having a coating formed from the coating composition of claim 1 from its application to the substrate with drying and curing by heating.

5. A coating composition according to claim 1, wherein the epoxy-polyester copolymer contains between 1 and 20 ester polymeric units.

6. A protective coating composition in an organic liquid carrier comprising a polymeric film forming binder, the polymeric binder comprising by weight:
 (a) 50 to 100% of an epoxy-polyester block copolymer being the reaction product of a preformed epoxy resin and a preformed carboxyl functional polyester prepolymer; wherein the carboxyl functional polyester prepolymer is the reaction product of one or more polyols with one or more dicarboxylic acids or their anhydrides, where the dicarboxylic acids or anhydrides comprise a mixture of (i) 20% to 45% of an aromatic dicarboxylic acid or its anhydrides, (ii) 55 to 80% of cyclohexane dicarboxylic acid, and (iii) 0 to 10% other aliphatic dicarboxylic acid, where the sum of (i), (ii), and (iii) is 100% based on the weight of the dicarboxylic acid and anhydride components;
 (b) 0 to 50% of a crosslinker for the sum of (a) and (b) that is 100%; and
 (c) polyvinyl chloride (PVC) of a particle size of 0.5 to 12 microns, where the organic liquid carrier does not dissolve the PVC; and
where protective coatings from the protective coating composition have an amount of bisphenol A diglycidyl ether (BADGE) of less than 1 ppm.

7. A composition as claimed in claim 6 which comprises 20% to 70% of PVC based on the total weight of epoxy-polyester block copolymer plus crosslinker plus PVC.

8. A protective coating composition in an organic liquid carrier comprising a polymeric film forming binder, the polymeric binder comprising by weight:
 (a) 50 to 100% of an epoxy-polyester block copolymer being the reaction product of a preformed epoxy resin and a preformed carboxyl functional polyester prepolymer; wherein the carboxyl functional polyester prepolymer is the reaction product of one or more polyols with one or more dicarboxylic acids or their anhydrides, where the dicarboxylic acids or anhydrides comprise a mixture of (i) 20% to 45% of an aromatic dicarboxylic acid or its anhydrides, (ii) 55 to 80% of cyclohexane dicarboxylic acid, and (iii) 0 to 10% other aliphatic dicarboxylic acid, where the sum of (i), (ii), and (iii) is 100% based on the weight of the dicarboxylic acid and anhydride components, wherein the epoxy-polyester block copolymer is reacted further with an organic monocarboxylic acid; and
 (b) 0 to 50% of a crosslinker for the sum of (a) and (b) that is 100%.

9. A coating composition according to claim 8 where the monocarboxylic organic acid is a fatty acid.

10. A coating composition according to claim 9 where they fatty acid is coconut fatty acid.

11. A process of making a coating composition in an organic liquid carrier comprising a polymeric film forming binder, the polymeric binder comprising by weight:
 (a) 50 to 100% of an epoxy-polyester block copolymer being the reaction product of a preformed epoxy resin and a preformed carboxyl functional polyester prepolymer, and (b) 0 to 50% of a crosslinker where the sum of (a) and (b) is 100%,
 wherein the carboxyl functional polyester prepolymer is the reaction product of one or more polyols with one or more dicarboxylic acids or their anhydrides, where the dicarboxylic acids or anhydrides comprise a mixture of (i) 20% to 45% of an aromatic dicarboxylic acid or its anhydrides, (ii) 55 to 80% of cyclohexane dicarboxylic acid, and (iii) 0 to 10% other aliphatic dicarboxylic acid, where the sum of (i), (ii), and (iii) is 100% based on the weight of the dicarboxylic acid and anhydride components, whereby protective coatings from the protective coating composition have an amount of bisphenol A diglycidyl ether (BADGE) of less than 1 ppm which comprises the step of heating the epoxy-polyester block copolymer in the presence of phosphoric acid or a base prior to adding the block copolymer to the coating composition.

12. The process of claim 11 where the epoxy-polyester copolymer is heated with the phosphoric acid prior to adding the epoxy-polyester to the coating composition.

13. A coated plastic, glass or metal can having a coating of a protective coating composition in an organic liquid carrier comprising a polymeric film forming binder, the polymeric binder comprising by weight:
 (a) 50 to 100% of an epoxy-polyester block copolymer being the reaction product of a preformed epoxy resin and a preformed carboxyl functional polyester prepolymer, and (b) 0 to 50% of a crosslinker where the sum of (a) and (b) is 100%,
characterized in that the carboxyl functional polyester prepolymer is the reaction product of one or more polyols with one or more dicarboxylic acids or their anhydrides, where the dicarboxylic acids or anhydrides comprise a mixture of (i) 20% to 45% of an aromatic dicarboxylic acid or its anhydrides, (ii) 55 to 80% of cyclohexane dicarboxylic acid, and (iii) 0 to 10% other aliphatic dicarboxylic acid, where the sum of (i), (ii), and (iii) is 100% based on the weight of the dicarboxylic acid and anhydride components, whereby protective coatings from the protective coating composition have an amount of bisphenol A diglycidyl ether (BADGE) of less than 1 ppm.

* * * * *